United States Patent [19]

Oestreich

[11] Patent Number: 5,418,877
[45] Date of Patent: May 23, 1995

[54] METHOD AND APPARATUS FOR INTRODUCING A LIGHT WAVEGUIDE INTO A TUBULAR ENVELOPE

[75] Inventor: Ulrich Oestreich, Munich, Germany

[73] Assignee: Siemens Aktiengesellschaft, Munich, Germany

[21] Appl. No.: 125,810

[22] Filed: Sep. 24, 1993

[30] Foreign Application Priority Data

Oct. 7, 1992 [DE] Germany .......... 42 33 815.8

[51] Int. Cl.[6] .................................. G02B 6/44
[52] U.S. Cl. ...................... 385/100; 385/101; 385/102
[58] Field of Search .................. 385/100–115, 385/84; 226/1–8

[56] References Cited

U.S. PATENT DOCUMENTS 4,514,035  4/1985  Steinmann et al. ............. 385/103
4,640,576  2/1987  Eastwood et al. ............... 226/7
4,746,190  5/1988  Oestreich et al. .............. 385/111 X
4,759,602  7/1988  Pascher ......................... 385/111
5,054,880  10/1991 Bruggendieck .................. 226/2 X
5,138,683  8/1992  Oestreich et al. .............. 385/109

*Primary Examiner*—Rodney B. Bovernick
*Assistant Examiner*—Phan Thi Heartney Palmer
*Attorney, Agent, or Firm*—Hill, Steadman & Simpson

[57] ABSTRACT

A light waveguide is guided in the longitudinal direction over a defined length together with a filling compound, which are to be introduced into an outer envelope. The velocity of the light waveguide is subsequently decelerated to a lower value due to the reduction of velocity of the filling compound as it enters into the tubular envelope and, thus, the change in velocity converts the excess length of the waveguide into a non-straightline course or a serpentine configuration within the filling compound in the envelope.

14 Claims, 2 Drawing Sheets

METHOD AND APPARATUS FOR INTRODUCING A LIGHT WAVEGUIDE INTO A TUBULAR ENVELOPE

BACKGROUND OF THE INVENTION

The present invention is directed to a method and apparatus for introducing at least one light waveguide into a tubular envelope, wherein the light waveguide is moved in a longitudinal direction by a filling compound introduced into the tubular envelope.

DE 30 27 743 discloses a method for inserting a light waveguide into a tubular envelope with a filling compound. As disclosed, the light waveguide is pushed into the filling compound so that it has a wavy or serpentine course yielding an excess length therein. The filling compound is thereby either supplied simultaneously with the light waveguide via a single filling tube or by separate filling tubes which are employed for the delivery of the light waveguide, on the one hand, and for the delivery of the filling compound, on the other hand. In those instances wherein the light waveguides in the prior art are not introduced into the guide tube in common with the filling compound, a separate force conveying means is provided for the longitudinal motion of the light waveguide and this separate means will provide the light waveguide with the necessary feed rate which is required for achieving the wavy course or pattern.

SUMMARY OF THE INVENTION

The object of the present invention is to provide a method and an apparatus wherein the necessary excess length for the light waveguide can be achieved in an especially simple and effective way. This is accomplished in an improvement for a method of introducing at least one light waveguide into a tubular envelope, wherein the light waveguide is moved in a longitudinal direction by a filling compound which is also introduced with pressure within the tubular envelope. The improvements are that the light waveguide is initially guided pressurelessly and is subsequently guided over a defined length together with the filling compound which has a defined specific velocity and thereby will entrain the waveguide and then, subsequently, the velocity of the filling compound proceeding in the longitudinal direction is reduced to a second velocity which will cause a deceleration of the light waveguide and cause an excess length to be created due to the first velocity of the waveguide and this excess length will be converted into the non-straightline course, such as a serpentine pattern.

The invention makes it possible to initially guide the light waveguide in a simple and gentle way, namely pressurelessly and without contact with the filling compound. This offers the possibility of, for example, designing a guide channel or a guide tube for the light waveguide so that it is best suited for an optimum guidance of the light waveguide without having to take the conveying of the filling compound and the problems involved therewith, for example stickiness, pressure, risk of blockage or the like, into consideration. An additional external force conveying means is not required in the invention because an entrainment or, respectively, impression of the corresponding hauloff speed occurs due to the filling compound following the pressureless guiding of the light waveguide. The simple, following deceleration of the light waveguide, as a consequence of the subsequently reduced speed of the filling compound, directly effects the excess length because the preceding, high speed of the light waveguide can only be compensated in this way, which is a wavy pattern of the light waveguide within the tubular envelope. The size of the excess length that is respectively set depends in a simple way on the higher speed that is impressed on the light waveguide compared to the lower speed to which the filling compound together with the light waveguide is subsequently brought.

The invention is also directed to the apparatus for implementation of the method of the invention which is characterized in that the guide tube is provided for the pressureless guidance of the light waveguide and that the end of the guide tube is terminated before the termination of the guide tube which is used for delivering the filling compound and in that both guide devices project at least partially into the tubular envelope for the light waveguide.

Other advantages and features of the invention will be readily apparent from the following description of the preferred embodiments, the drawings and claims.

DESCRIPTION OF THE PREFERRED EMBODIMENTS

Figure 1:
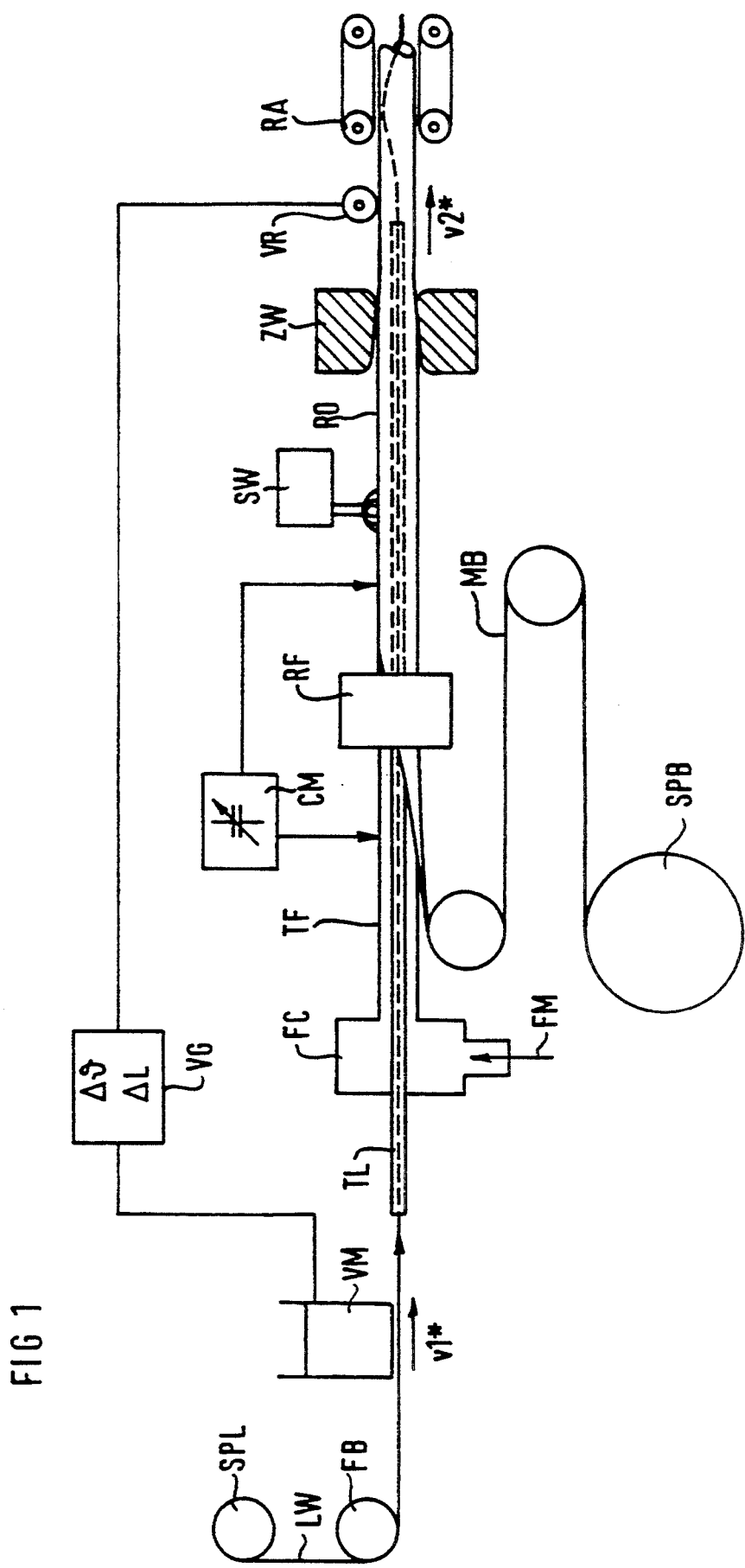
FIG. 1 is a schematic illustration of a structure of an apparatus working according to the method of the present invention.

The principles of the present invention are particularly useful when incorporated in an apparatus schematically illustrated in FIG. 1. The apparatus includes a reel SPL from which a light waveguide LW is taken off. This light waveguide LW is then guided over a fiber brake FB that is expediently speed-controlled and that is composed of a decelerated sheave around which the light waveguide LW is wrapped once in a simple case. The light waveguide LW subsequently enters into a guide tube TL, wherein it continues to be conveyed toward the right pressurelessly and practically without contact with a potential filling compound. The guide tube TL is designed so that the light waveguide can be moved forward with as little friction as possible, for example by introducing a gliding wax.

It is also possible to simultaneously introduce a plurality of light waveguides wherein a greater plurality of supply reels analogous to SPL and fiber brakes analogous to FB would then be provided. Analogous to the light waveguide LW, a potential light waveguide bundle obtained in this way would be introduced in a corresponding guide tube, such as TL.

A filling compound FM is introduced into a filling chamber FC under pressure, as indicated by the arrow, and this filling compound is delivered for purposes of embedding the light waveguide. The filling compound FM is moved toward the right inside a tubular guide TF, which concentrically surrounds the guide tube TL for the light waveguide LW.

For forming a tubular envelope, means are provided which are illustrated. As illustrated, the means is a tube-forming means RF which receives a metal band MB from a supply reel SPB. The metal band is shaped into a closed tube RO with mating edges in the tube-shaping means RF and then the mating edges are closed or welded together with a welding apparatus SW. Since the filling compound FM proceeds inside the guide tube TF in the region of the welding means SW, there is no contact of the filling compound here and there is, thus, no risk that, for example, the filling compound will be chemically decomposed due to the high temperatures during welding or will be damaged or deteriorated in any other way. The tube closed on all sides obtained in this way is supplied to a drawing apparatus ZW with which it is calibrated down to a predetermined outside diameter. The guide tube TF still also extends up through the calibrating means ZW and beyond so that the filling compound is also not deteriorated during this drawing step due to the high temperature produced in the drawing process. The tubes TF and TL could be far shorter for a normal purpose. Since, however, the metal tube RO must first be welded and calibrated before the filling compound is contacted, the longer arrangement shown here will be used.

The guide tube TF for the filling compound FM has its end TFE (see FIG. 2) arranged at a greater distance from the calibration tool ZW, preferably a few cm. As a result of the above-described arrangement, the filling compound FM is also protected against higher temperatures when the tube RO is composed, for example, of plastic and is manufactured by an extrusion means.

Figure 2:
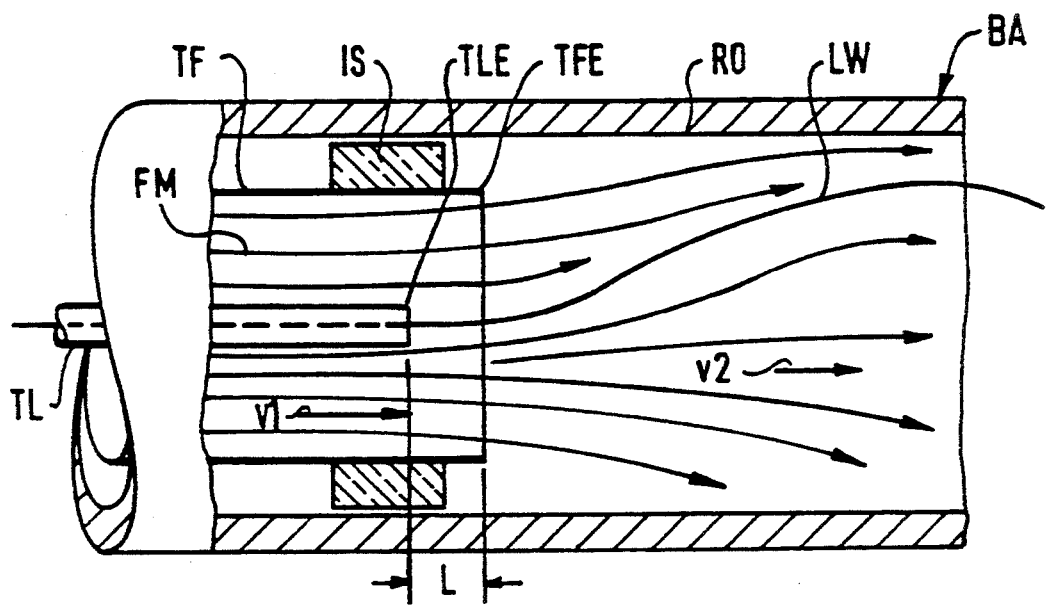
FIG. 2 is an enlarged region with portions partially broken away illustrating the termination of the tubes for guiding the waveguide and filling material inside the outer sheath.

The details of the course of the flow in the region of the end of the guide tube TF for the filling compound may be seen from the enlarged illustration of FIG. 2. The guide tube TL for the light waveguide LW has an end TLE which is displaced to the left by a length L before the end TFE of the guide tube TF for the filling compound FM. The light waveguide LW is guided without any pressure within the guide tube TL, for example there is no filling compound FM in the inside of this tube apart, perhaps, from the slight amount of the filling compound which may enter the end TLE. After leaving its guide tube TL, which surrounds it on all sides, the light waveguide LW is seized by the filling compound FM, which moves forward here with a velocity v1 from the left to the right in a throughput direction. Dependent on the velocity of the filling compound, on the roughness of the surface of the light waveguide and on the length L over which the filling compound FM having the velocity v1 comes into contact with the light waveguide LW, the light waveguide will be entrained and brought to a velocity v1* to which the following relationship will occur: v1>v1*.

The guide tube TF for the filling compound ends after the length L in which the light waveguide LW is moved together with the filling compound FM. The metal tube RO has a larger cross section than the tube TF and, thus, more space is available for the filling compound FM beginning with the end TFE of this tube. The result thereof is that the velocity with which the filling compound is moved within the tube RO is greatly diminished, namely to a value v2. Given the condition that the velocity v1* of the light waveguide LW has reached the value of which v1*>v2 is valid, the excess length will occur due to the high velocity v1* of the light waveguide LW and can be compensated practically only in that the light waveguide will proceed correspondingly arcuately or helically roughly from the exit location from the guide tube TF, so that the excess length of the light waveguide will be preserved in the bundle lead or, respectively, hollow lead BA obtained in this way.

The excess length becomes all the greater the greater the difference between the velocity v1* and v2. This velocity difference can be set in a simple way, for example by varying the length L with a greater length L yielding a higher velocity v1*, by varying the viscosity of the filling compound FM, wherein a higher viscosity yields a higher velocity v1*, by a corresponding dimensioning of the fiber brake FB, as well as by a corresponding selection of the values of the inside diameter of the guide tube TF and of the inside diameter of the protective tube RO. With a given velocity v1, the velocity v2 becomes all the lower and the excess length of the light waveguide LW in the finished light waveguide lead BA becomes correspondingly greater when there is a larger difference between the two diameter values of the tube RO and tube TF.

Figure 3:
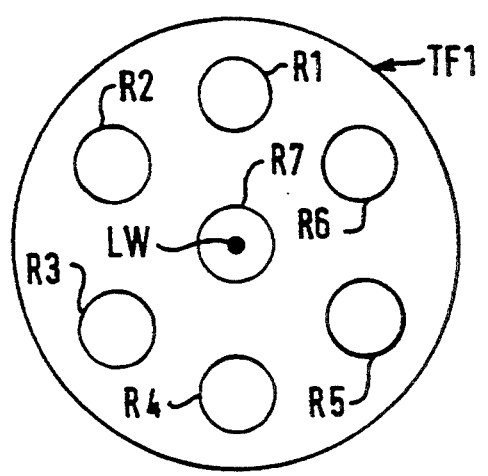
FIG. 3 is an end view of a modified guidance arrangement for the light waveguide and filling compound.

Since the guide tube TF becomes relatively long, on the order of magnitude of at least approximately 1 meter, it can be expedient for obtaining an optimally stable form and a form that is suitable for high pressure to select the structure such as shown in FIG. 3. A plurality of bores R1 through R6 having their centers arranged on a circular line are arranged therein in a stable guide tube TF1. The filling compound FM is pressed through these bores R1 through R6. Another bore R7 proceeds coaxially thereto and is provided in the middle, and the light waveguide LW is arranged therein. Analogous to the structure of FIG. 3, for example, is a central tube corresponding to the bore R7 and a series of additional tubes corresponding to the bores R1 through R6 which are arranged around the central tube and are combined to form a guide member, for example by welding instead of providing bores in a solid member.

After the end of the manufacturing and filling process, the tube RO is grasped at the outside and is correspondingly conveyed away, for example to be deposited on a disk or to be wound on a drum. To this end, for example, a pulling device, such as a caterpullar RA can be provided.

Optimally exact velocity measurements are expedient for defining the value of the excess length of the light waveguide LW in the finished light waveguide lead BA. To this end, the velocity v1* with which the light waveguide is drawn into the guide tube TL is first identified with a measuring means VM. The measurement of the length of the light waveguide LW, for example the indirect measurement of the velocity v1* can occur via electrostatic surface fields, wherein a plurality of light waveguides may be compelled to assume a precise synchronism, for example via roller systems or via a suitable band traction device.

The velocity v2* of the tube RO is also identified with a roller VR, wherein this roller will run without slippage on the outside surface of the tube RO. The measured value obtained in this way can be expediently converted into an electrical pulse and is supplied to a comparison means VG which simultaneously receives the value of the velocity v1* from the measuring means VM. The excess length $\Delta L$ with which the light waveguide LW is arranged in the inside of the tube RO occurs from the difference between these two velocity values.

It is also possible to measure the velocity with which the metal band MB is hauled off and to take the degree of the calibration computationally into consideration on the basis of the calibration means ZW and to, thus, proceed to the determined velocity V2*.

Optimum care should also be exercised to see that the filling compound FM, in fact, completely fills out the interior of the tube RO. This is not only true of the tube design set forth, but also quite generally true. In addition to the application of a correspondingly high pressure for the delivery of the filling compound, a specific measuring instrument is also expedient for this purpose, wherein one can preferably have recourse to a capacitance measurement. To this end, the filling means for the filling compound FM, for example the filling chamber FC together with the delivery lines for the filling compound FM and the metallic guide tube TF is guide in an insulated fashion relative to the metal tube RO. In order to assure this, the guide tube TF is singly or multiply supported on the inside against the tube RO by insulating supports IS (see FIG. 2). Thus, capacitance between the metal tube TF and the outside tube RO of the light waveguide lead BA can be identified with a corresponding capacitance measurement means CM (FIG. 1). When, for example, a larger air inclusion occurs in the region of the exit location of the filling compound FM at the end TFE of the guide tube TF, the capacitance which is identified with the measuring instrument CM becomes lower because the electrical constant of the filling compound, which usually contains oil, is correspondingly higher than that of air. During the start-up procedure, of course, such an air bubble is always initially present and the condition wherein a complete and all-around filling of the tube RO is guaranteed will be achieved at the moment at which the air bubble has disappeared, and this will provide a measured capacitance value which will reach its maximum.

A tubular envelope RO having one or more light waveguides is especially suitable as a central element for guard wire/overhead cables, wherein a tight inclusion of the light waveguides, on the one hand, and a complete filling of the interior with the filling compound, on the other hand, are absolutely necessary. In addition, the tubular transmission element is also suitable, for example, as a central element for submarine cables or overhead cables, whereby one or more layers of tensile elements are to be respectively applied onto the central element and a single-layer or multi-layer cladding is to be additionally applied on the outside to form an optical cable.

Expedient values for the optical transmission element manufactured according to the present invention are, for example, an excess length of the light waveguides: 0.5%; inside/outside diameter of the tube RO: 5.2/6.0 mm; inside/outside diameter of the guide tube TL: 1.5/1.8 mm; and inside/outside diameter of the guide tube TF: 3.0/3.5 mm.

Although various minor modifications may be suggested by those versed in the art, it should be understood that I wish to embody within the scope of the patent granted hereon all such modifications as reasonably and properly come within the scope of my contribution to the art.

I claim:

1. In a method for introducing at least one light waveguide into a tubular envelope, which includes moving the light waveguide in a longitudinal direction and moving a filling compound in the same direction and, thus, introducing both the waveguide and filling material into the tubular envelope, the improvements comprising guiding the light waveguide in a pressureless manner and then introducing the waveguide into a flow of the filling compound for a specific length of travel, wherein the light waveguide will achieve a velocity close to the velocity of the filling compound and then subsequently reducing the velocity of the filling compound as the filling compound and waveguide are introduced into said tubular envelope which is a metal envelope and is moving at a lower velocity, said reducing of the velocity causing the light waveguide to have an excess length which is converted into a non-straightline course within the tubular envelope, and measuring the electrical capacitance between the tubular envelope and a metal guide tube for the filling compound with capacitance measuring means.

2. In a method according to claim 1, which includes a step of providing the tubular envelope by manufacturing the envelope.

3. In a method according to claim 2, wherein the step of manufacturing the tubular envelope of metal includes providing a flat band, shaping it into a tube with edges in contact and welding the edges together to form a closed tubular envelope.

4. In a method according to claim 2, which further includes subjecting the tubular envelope to a calibration process.

5. In a method according to claim 1, wherein the filling compound and the light waveguides are each respectively guided in at least one guide tube as it is being introduced into the tubular envelope.

6. In a method according to claim 5, wherein the light waveguide and the filling compound are guided within respective tubes until they pass a potential arrangement for forming the tubular envelope.

7. In a method according to claim 1, which includes measuring the velocity at which the light waveguide enters into the tubular envelope and measuring the velocity with which the tubular envelope is being moved, wherein the excess length of the light waveguide within the tubular envelope will be identified from these two measured velocity values.

8. In a method according to claim 1, includes determining when the delivery of the filling compound is a maximum for completely filling the tubular envelope by the electrical capacitance reaching a maximum value.

9. An apparatus for introducing at least one light waveguide with a filling compound into a tubular envelope comprising means for forming a metal tubular envelope, a first guide tube extending through the means for forming the metal tubular envelope and terminating downstream therefrom, said guide tube being connected to means for providing a filling compound, insulating means for electrically insulating the tubular envelope from the first guide tube, capacitance measuring means being connected to the tubular envelope and to the first guide tube to determine the capacitance therebetween, a second guide tube extending into the first guide tube and terminating upstream from the end of the first guide tube, and means for introducing a waveguide into the second guide tube for conveyance in a pressure-free manner.

10. An apparatus according to claim 9, wherein the second guide tube is arranged approximately centrally within the tubular envelope.

11. An apparatus according to claim 9, wherein the second guide tube is arranged preferably centrally within the first guide tube.

12. An apparatus according to claim 11, wherein the insulating means also electrically insulates the second guide tube from the tubular envelope.

13. An apparatus according to claim 9, which includes measuring means for determining the velocity of the light waveguide in the second guide tube, measuring means being provided for identifying the velocity of the tubular envelope, evaluation means for receiving the measured values from said two measuring means to provide identification of the excess length of the light waveguide within the tubular envelope.

14. An apparatus according to claim 13, wherein the insulating means insulates the second guide tube from the tubular envelope and the means for forming the metal tubular envelope forms the envelope from a band of metal and welds the edges of the band together.

* * * * *